United States Patent [19]
> Oehrlein et al.

[11] 4,207,390
[45] Jun. 10, 1980

[54] ONE PIECE BATTERY SIDE TERMINAL CONNECTOR

[75] Inventors: Willard J. Oehrlein, Milwaukee; James C. Engman, Waukesha, both of Wis.

[73] Assignee: Gould Inc., Rolling Meadows, Ill.

[21] Appl. No.: 957,122

[22] Filed: Nov. 2, 1978

[51] Int. Cl.² .............................................. H01M 2/30
[52] U.S. Cl. .................................... 429/179; 429/182; 29/623.2
[58] Field of Search ................................ 429/179, 182

[56] References Cited
U.S. PATENT DOCUMENTS

| | | | |
|---|---|---|---|
| 1,316,490 | 9/1919 | Loudon | 429/179 |
| 2,548,558 | 4/1951 | Raney | 429/179 |
| 3,767,467 | 10/1973 | Miller et al. | 429/179 |

FOREIGN PATENT DOCUMENTS 47404   4/1974   Australia ................................: 429/179

*Primary Examiner*—Donald L. Walton

*Attorney, Agent, or Firm*—Leydig, Voit, Osann, Mayer & Holt, Ltd.

[57] ABSTRACT

A battery side terminal assembly comprises a continuous collar molded integrally with the side wall of a container and projecting outwardly therefrom with an opening through the wall within the collar, the terminal being one piece and including a head portion, a base portion extending through the opening in the wall and abutting the periphery thereof and a skirt portion which is spaced from the interior face of the side wall, the base portion having a plurality of spaced keys which engage complementally shaped recesses in the periphery of the wall opening, sealing being provided by means such as an elastomeric O-ring positioned between the interface of the head portion of the terminal and the outer face of the wall, and the outward terminal portion of the collar being heat staked to the outer face of the head portion of the terminal to hold the terminal in position, the assembly providing satisfactory torque resistance and an electrolyte leakage resistant battery.

10 Claims, 9 Drawing Figures

4,207,390

ONE PIECE BATTERY SIDE TERMINAL CONNECTOR

This invention relates generally to electric storage batteries and, more particularly, to a side terminal therefor and to a method for assembling the side terminal in the battery container.

As one step toward producing automotive-type batteries in which little or no maintenance is required, it has been proposed to locate the battery electric terminals on the side of the container so that they are less exposed to mechanical or corrosive damage. Such terminals are often also provided with female treads to facilitate making an electrically good, vibration-resistant connection with a male threaded member on the battery lead.

Since a side terminal is located below the electrolyte level in the battery, sealing against liquid leakage is critically important. Also, a threaded side terminal must be quite torque resistant to prevent anticipated handling, and mishandling, from breaking the seal or even the electrical connection to the battery plates. These problems are magnified by the need for minimizing the size of the terminal assembly, and the increasingly prevalent use of materials for the container which allow the walls of the container to be relatively thin and flexible.

U.S. Pat. No 3,767,467, assigned to the assignee of the present invention, shows a leak proof, torque resistant side terminal assembly. The assembly comprises a metal terminal which passes through the battery container wall. The head portion of the terminal is shielded by a barrier ring molded on the container wall and is locked against rotation by interengaging lugs. The assembly is sealed against electrolyte leakage by a gasket. In assembly, the metal terminal which extends through the container wall is joined, as by fusing, with a metal ring which is positioned on the inside of the container's side wall. The parts are then brought into a tightly sealed relationship by exercising simple squeezing pressure to sandwich the container wall between the exterior portion of the terminal and the interior metal locking ring.

The side terminal configuration shown in U.S. Pat. No. 3,767,467 does in fact provide an assembly which performs rather satisfactorily. Yet, since this is a two piece configuration, the assembly requires fusing the two parts together and thereafter applying pressure to compress the parts with sufficient force to provide a leak-proof container. These assembly operations can tend to be relatively tedious and time consuming and, if not carried out very carefully, can present quality control problems.

It has accordingly been previously proposed to utilize a one piece side terminal. One attempt to utilize this type of a side terminal has been to maintain the battery container at a sufficiently low temperature so that the side terminal can be die cast in place. It may thereafter be necessary in such instances to crimp or otherwise deform the plastic container to, in effect tighten up the seal between the plastic container and the die cast side terminal so as to provide adequate resistance to electrolyte leakage. It has also been proposed to mold the plastic container, in effect, around an already formed side terminal. German Pat. No. 2,024,223 shows the utilization of one piece, side terminal configurations.

None of the proposed one piece side terminals provide the ease of assembly that is desirable. The proposed configurations likewise could well create quality control problems.

It is accordingly the principal aim of the present invention to provide an improved one piece, battery side terminal characterized by satisfactory torque resistance and resistance to electrolyte leakage.

A further object provides a one piece side terminal that is capable of being easily assembled. A related and more specific object is to provide a one piece side terminal which is well suited to economical, high volume production in assembly with the battery container.

Yet another object lies in the provision of a one piece side terminal which is compact and also well protected against accidental damage, installation and use of the battery.

Other objects and advantages of the invention will become apparent upon reading the following detailed description and upon reference to the drawings, in which.

While the invention will be described in connection with a preferred embodiment, it should be understood that there is no intention to limit the invention to that embodiment. On the contrary, it is the intention to cover all alternatives, modifications, and equivalents as may be included within the spirit and scope of the invention as defined by the appended claims.

In general, the present invention is predicated on the development of a one piece side terminal and a complementally shaped opening in the side wall of the battery container which allows ready insertion of the side terminal into the desired position. The side terminal is held in position by heat staking a collar which surrounds the opening in the side wall. The configuration of the side terminal cooperates with the configuration of the side wall opening to provide adequate torque resistance. Resistance to electrolyte leakage is provided by a sealing means which is positioned in final assembly between the exterior portion of the side terminal and the outer surface of the container side wall, the sealing being effected between the interior surface of the collar and the annular shoulder of the side terminal.

Figure 1:
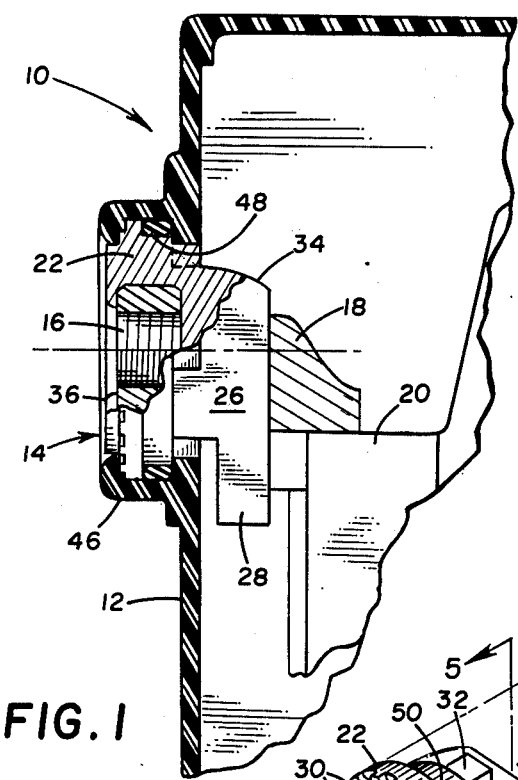
FIG. 1 is a partial cross-section view and illustrates an assembled one piece side terminal battery configuration according to the present inventions.

Turning now to the Figures, there is shown in FIG. 1 a battery 10 having a side wall 12 with a side terminal 14 according to the present invention in its assemblied position. While only one side terminal is shown and will be discussed herein for the sake of simplicity, it should be appreciated that the battery will have two side terminals which are typically located at the opposite ends of one of the long side walls of the battery container. Also, and preferably, the side wall 12 as well as the rest of the battery container is molded from a plastic material having the physical characteristics which allow a relatively thin cross-section to meet the applicable standards for the battery container. At the present time, propylene-ethylene copolymers are widely used to provide thin wall plastic battery containers.

In the assembled form, the terminal 14 is formed of a metal such as lead and has internal threads 16 for making connection with a male threaded member on the battery lead. The terminal is likewise electrically connected by a lug 18 to the plate structure 20 within the adjacent battery cell. The individual cells can be interconnected by any desired means. Several techniques are well known.

Figure 2:
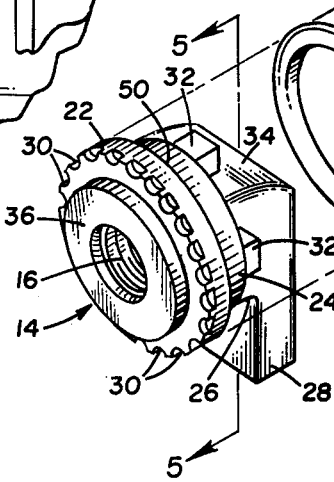
FIG. 2 is an exploded perspective view and shows the various components of the side terminal prior to assembly.
Figure 5:
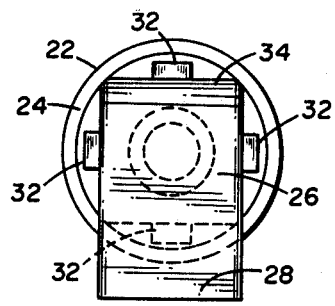
FIG. 5 is a plan view taken generally in the direction of lines 5—5 as shown in FIG. 2 and shows the rear of the one piece side terminal in accordance with this invention.

In accordance with the present invention, the one piece side terminal has a configuration which contributes to torque resistance in the assembled position, serves as a receptacle for the sealing means needed to prevent electrolyte leakage and aids in allowing its insertion into the battery container. To this end, and as is shown in FIGS. 2 and 5, the side terminal 14 includes a head portion 22 having a recessed portion 24 which serves to accomodate the sealing means, a base portion 26 which extends through the container side wall 12 and a depending skirt 28. It should be appreciated that the internal threads 16 will typically be defined by a nut member embedded within the head portion 22 of the side terminal 14 since it is desirable to form the threaded portion from a harder metal than the relatively soft lead generally used for the terminal.

Pursuant to the present invention, the head and base portions of the side terminal are thus configured to provide, in the assembled position, satisfactory resistance to torque. Thus, the head portion 22 is provided with a series of cut-away portions or scallops 30 formed about the periphery so as to allow, in the final assembly step, plastic to flow herein to increase the area of surface contact. The particular shape and dimension of these cut-away portions can vary so long as the surface contact is satisfactorily increased. Further, the base portion 26 is desirably rectangular or square in configuration so as to optimize the resulting torque resistance and is also provided with a series of keys 32 which even further and significantly increase torque resistance. The number of keys can be varied, but the number and size should be designed in relation to the shape and size of the opening in the container side wall since the plastic about the periphery of the opening can be reduced to the point where the torque resistance could well be decreased. Desirably, four keys are employed and are symmetrically positioned around the base so that the side terminal may be assembled with the depending skirt portion facing either upwards or downwards as the particular internal battery configuration dictates.

The skirt portion of the side terminal should be designed so as to provide a satisfactory amount of lead and surface contact so that the necessary electrical connection can be readily made. To this end, it is preferred that the surface of the skirt portion 28 be preferably relatively flat.

Pursuant to the one aspect of the present invention, the configuration of the surface adjoining the base portion with the skirt portion of the side terminal which is opposite the terminal end of the skirt is designed to facilitate insertion of the side terminal into the side wall opening. Thus, as is shown in FIG. 1, the base portion 26 connects with the skirt portion 28 via a downwardly extending bevel 34.

As is shown in FIG. 2, the head portion 22 may be provided, if desired, with a raised central surface which surrounds the threaded member 16. This raised surface 36 can serve as, in effect, a stop for the plastic upon heat staking in the final assembly step, as will be described hereinafter.

Figure 3:
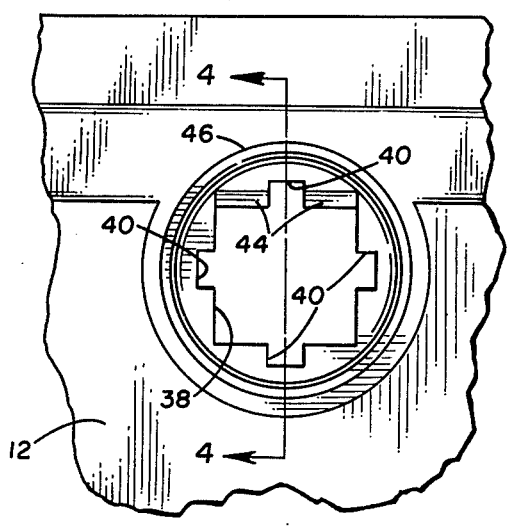
FIG. 3 is a plan view taken generally in the direction of line 3—3 as indicated in FIG. 2 and illustrates the configuration of the battery container.

In keeping with the present invention, the side wall of the battery container is provided with an opening complementally shaped to the side terminal and also a collar surrounding the opening to provide a means for holding the side terminal in the desired position upon final assembly as well as to protect the side terminal against damage. As is thus shown in FIGS. 2 through 4, the side wall 12 is formed with an opening 38, the periphery of which is complementally shaped so as to contact the periphery of the base portion 26 of the side terminal 14 after assembly. Recesses or key ways 40 are provided in the periphery of the opening 38 to accept the keys 32 on the base portion 26 of the side terminal 14, cooperating to significantly increase torque resistance.

Figure 4:
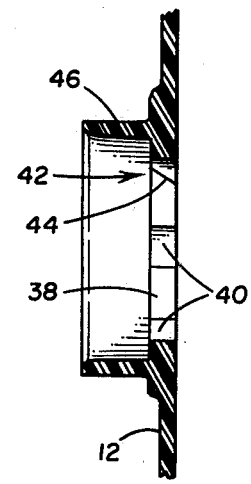
FIG. 4 is a cross-section view taken generally along the lines 4—4 of FIG. 3 and further shows details of the desired configuration of the battery container.

According to one aspect of the present invention, it is preferred to bevel either the top or bottom portion of the opening so as to further facilitate the insertion of the side terminal into its desired final position. To this end, and as is shown in FIG. 4, the top portion, generally shown at 42, is provided with an inwardly and downwardly extending bevel 44. As may be appreciated, if the side terminal 14 was to be inserted so that the depending skirt portion 28 would be pointed upwardly, the bevel portion would then be located on the bottom portion of the opening 38. The assembly of the side terminal into the battery container will be discussed later.

In keeping with the present invention, a collar 46 is included in the battery container which serves to accept the head portion of the side terminal, cooperates to provide the necessary sealing and provides the necessary material for the heat staking operation in the final assembly step as will be hereinafter discussed. Preferably, the collar 46 should be of sufficient height so that, after heat staking, the head portion 22 and its raised surface 36 of the side terminal 14 are slightly recessed to prevent, for example, shorting of the battery if a conductive member of some sort is accidentally placed across the side terminal areas.

Resistance to electrolyte leakage is imparted by positioning a sealing means between the head portion of the side terminal and the outside surface of the container side wall. Thus, as is shown in FIGS. 1 and 2, an elastomeric O-ring 48 is positioned in the recess portion 24 of the side terminal 14. After final assembly, the O-ring 48 is positioned between the rearward face 50 of the head portion 22 of the side terminal 14 and the outer face 52 of the container side wall 12.

Figure 6:
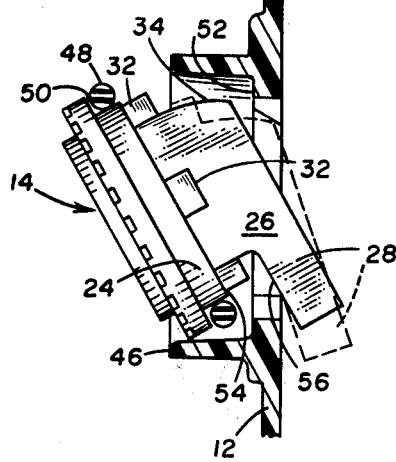
FIG. 6 is a cross-sectional view similar to FIG. 4 and illustrates the initial step of inserting the one piece side-terminal shown in FIG. 5 into the battery container.
Figure 7:
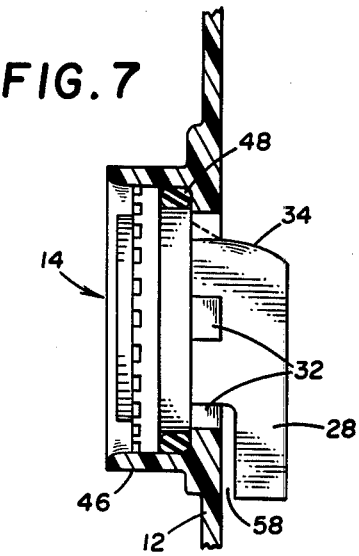
FIG. 7 is a cross-sectional view similar to FIG. 6 and shows the side terminal in its final upright position in the battery container prior to the final assembly step.

As is shown in FIGS. 6 and 7, the first step of assembly involves inserting the side terminal 14 into the battery 10. This is accomplished by, as shown in FIG. 6, inserting the side terminal 14 into the opening 38 of the container side wall 12 at an angle and then applying force, manually or otherwise, to the upper portion of the side terminal to bring it to an upright position as is shown in FIG. 7. In the preferred embodiment, as is shown in FIG. 6, the beveled surface 34 of the side terminal 14 cooperates with beveled surface 44 of the opening 38 in the side wall to create a camming action which facilitates assembly without unduly deforming the periphery of the opening. As should be appreciated, the distance between the inner surface of the recessed portion 24, shown at 54 (FIG. 6), and the outer surface of the skirt portion 28, shown at 56, should be sufficiently greater than the thickness of the side wall at the area of the opening so that the side terminal can in fact be inserted into the container. In addition, the spacing will provide an in ulating boundary or barrier to aid in protecting the plastic container side wall and the elastomeric O-ring from undesirable deformation as a result of the heat staking operation. A spatial separation between the side wall and the inner surface of the container side wall which results is shown generally at 58 in FIG. 7. From the functional standpoint, it is desirable to minimize the spatial separation as much as possible as this maximizes the internal useful volume that may be utilized by the battery plates. The final step in the assembly involves heat staking the collar in the container side wall to hold the side terminal in the desired upright position. To this end, the collar 46 of the side wall 12 is rolled over by suitable heat staking techniques from the position shown in FIG. 7 to the final, assemblied position illustrated in FIG. 1. The heat staking can be accomplished by heat sealing, using either heated rotary or stationery dies. Ultrasonics may likewise be utilized, and conventional ultrasonic equipment will allow the heat staking operation to be carried out in a matter of seconds.

Figure 8:
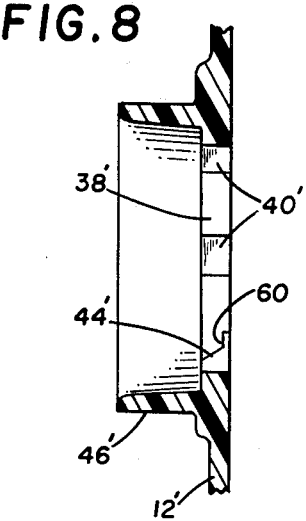
FIG. 8 is a cross-sectional view similar to FIG. 4 and illustrating an alternative construction for the container side wall.
Figure 9:
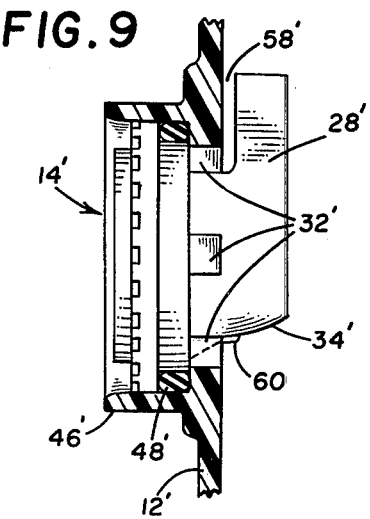
FIG. 9 is a cross-sectional view similar to FIG. 7 and showing the side terminal in its final upright position in a battery container having a side wall with the construction shown in FIG. 8.

FIGS. 8 and 9 show an alternative construction for the container side wall in accordance with the present invention. For simplicity, the numerals for the same elements in the original construction have been maintained. As thus shown in FIG. 8, the container side wall 12' is provided with a collar 46' surrounding the opening 38'. The portion of the side wall adjacent the bottom recess or keyway is inwardly and upwardly beveled as shown at 44'.

In accordance with an optional feature of this invention, means are provided to insure satisfactory resistance to electrolyte leakage. To this end, as is shown in FIG. 8, the bevel 44' terminates in a thin plastic wiper portion 60. When the side terminal 14' is in its final position, as is shown in FIG. 9 prior to the heat staking, the depending skirt portion 56' of the side terminal is in an upward direction, with the wiper portion 60 having been moved inwardly and resting against the leveled portion 34' of the side terminal 14'.

As has thus been seen, the present invention provides a one piece side terminal that can be readily assembled to provide a battery which has satisfactory torque resistance and resistance to electrolyte leakage. The side terminals are held in place solely by the heat staking operation, yet the assembled configuration can pass the industry standard of resistance to rotation upon application of 250 inch pounds of torque. The present invention likewise is readily amenable to high volume production and assembly.

We claim:

1. In a battery having a thin molded wall, a side terminal assembly comprising a continuous collar molded integrally with said wall and projecting outwardly therefrom and surrounding an opening through the wall, a one piece terminal having a head portion, a base portion extending through the opening and abutting the periphery thereof and a skirt portion spaced from the interior face of the wall, said base portion having a plurality of spaced keys engaging complementally shaped recesses in the periphery of the wall opening, sealing means positioned between the inner face of the head portion of the terminal and the outer face of the wall, the outward terminal portion of the collar being heat staked to the outer face of the head portion of the terminal to hold the terminal in position.

2. The battery of claim 1 wherein said base portion is rectangular.

3. The battery of claim 2 wherein the base portion is essentially square in shape.

4. The battery of claim 2 wherein there are four keys symmetrically spaced about said base portion.

5. The battery of claim 2 wherein the face of the base portion opposite the terminal portion of said skirt portion merges with the opposite end of the skirt in a bevel face.

6. The battery of claim 2 wherein the periphery of the head portion of the terminal has a series of spaced recesses.

7. The battery of claim 2 wherein said head portion has a raised central, outward face.

8. The battery of claim 2 wherein the inner face of said head portion has a recessed area and an elastomeric O-ring is positioned about and in contact with said recessed portion.

9. The battery of claim 2 wherein the terminal portion of the heat staked collar projects outwardly from the outer face of the head portion of the terminal.

10. A battery container having a side terminal assembly comprising a continuous collar molded integrally with said wall and projecting outwardly therefrom and surrounding an opening through the wall, a one piece terminal having a head portion, a base portion extending through the opening and abutting the periphery thereof and a skirt portion spaced from the interior face of the wall, said base portion having a plurality of spaced keys engaging complementally shaped recesses in the periphery of the wall opening, sealing means positioned between the inner face of the head portion of the terminal and the outer face of the wall, the outward terminal portion of the collar being heat staked to the outer face of the head portion of the terminal to hold the terminal in position.

* * * * *